United States Patent
Peng et al.

(10) Patent No.: US 10,026,201 B2
(45) Date of Patent: Jul. 17, 2018

(54) IMAGE CLASSIFYING METHOD AND IMAGE DISPLAYING METHOD

(71) Applicants: Inventec (Pudong) Technology Corporation, Shanghai (CN); INVENTEC CORPORATION, Taipei (TW)

(72) Inventors: Shao-Liang Peng, Taipei (TW); Jia-Yu Juang, Taipei (TW); Wen-Ching Hu, Taipei (TW); Te-Yi Wu, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 15/469,572

(22) Filed: Mar. 26, 2017

(65) Prior Publication Data
US 2018/0150977 A1    May 31, 2018

(51) Int. Cl.
*G06T 11/00* (2006.01)
*G06K 9/62* (2006.01)
*G06K 9/46* (2006.01)

(52) U.S. Cl.
CPC .......... *G06T 11/001* (2013.01); *G06K 9/4652* (2013.01); *G06K 9/6267* (2013.01)

(58) Field of Classification Search
CPC .......... G06K 9/4652; G06K 9/6267; G06F 17/3025; G06T 2207/20021; G06T 7/408
See application file for complete search history.

(56) References Cited

U.S. PATENT DOCUMENTS

| | | | |
|---|---|---|---|
| 8,705,896 B2 * | 4/2014 | Tang | G06T 3/4053 382/299 |
| 9,626,598 B2 * | 4/2017 | Zheng | G06T 7/11 |
| 2011/0103700 A1 * | 5/2011 | Haseyama | G06F 17/3025 382/225 |
| 2011/0158516 A1 * | 6/2011 | Wu | G06K 9/00697 382/165 |

* cited by examiner

*Primary Examiner* — Antonio A Caschera
(74) *Attorney, Agent, or Firm* — CKC & Partners Co., Ltd.

(57) ABSTRACT

An image classifying method includes the following operations: reducing an order of a color of a first image to generate a first order reduction image, wherein the first order reduction image includes several first image blocks; obtaining a second order reduction image from a database, wherein the second order reduction image includes several second image blocks; calculating several block color difference values between the first order reduction image and the second order reduction image respectively according to differences between a color value of each of the first image blocks and a color value of each of the second image blocks; and determining whether or not the first image belongs to a same category as the second order reduction image according to the block color difference values between the first order reduction image and the second order reduction image.

4 Claims, 4 Drawing Sheets

IMAGE CLASSIFYING METHOD AND IMAGE DISPLAYING METHOD

CROSS-REFERENCE TO RELATED APPLICATION

This application claims the priority benefit of Chinese Application serial no. 201611078456.5, filed Nov. 30, 2016, the full disclosure of which is incorporated herein by reference.

FIELD OF INVENTION

The invention relates to an image processing method. More particularly, the invention relates to an image classifying method and an image displaying method.

BACKGROUND

With the rise of social network or similar platforms and the advances in photographic technology, more and more users take images and upload them to a social network or similar platforms for other users to enjoy and share the images.

However, with more and more images being shared, the lack of good classification and image displaying method reduces the will of the users to browse the images on the social network. Therefore, how to classify the images appropriately so as to enhance the user's convenience in viewing the images and how to allow the users to browse the popular images more easily and quickly with appropriate display method or display order of images are the problems needed to be addressed in the art.

SUMMARY

An embodiment of this disclosure is to provide an image classifying method comprises the following operations: reducing an order of a color of a first image to generate a first order reduction image, wherein the first order reduction image includes a plurality of first image blocks; obtaining a second order reduction image from a database, wherein the second order reduction image comprises a plurality of second image blocks; calculating a plurality of block color difference values between the first order reduction image and the second order reduction image respectively according to differences between a color value of each of the first image blocks of the first order reduction image and a color value of each of the second image blocks of the second order reduction image; and determining whether or not the first image belongs to a same category as the second order reduction image according to the block color difference values between the first order reduction image and the second order reduction image.

An embodiment of this disclosure is to provide an image displaying method, suitable for a database which comprises a plurality of images, wherein the image displaying method comprises the following operations: classifying the images into a plurality of categories according to a plurality of color difference value between the images; collecting a plurality of scores of the images; adjusting at least one display parameter of the images according to one of the plurality of scores of each of the images; and displaying the images by the categories on a display interface according to the categories and the at least one display parameter.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting, in addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention.

Figure 1:
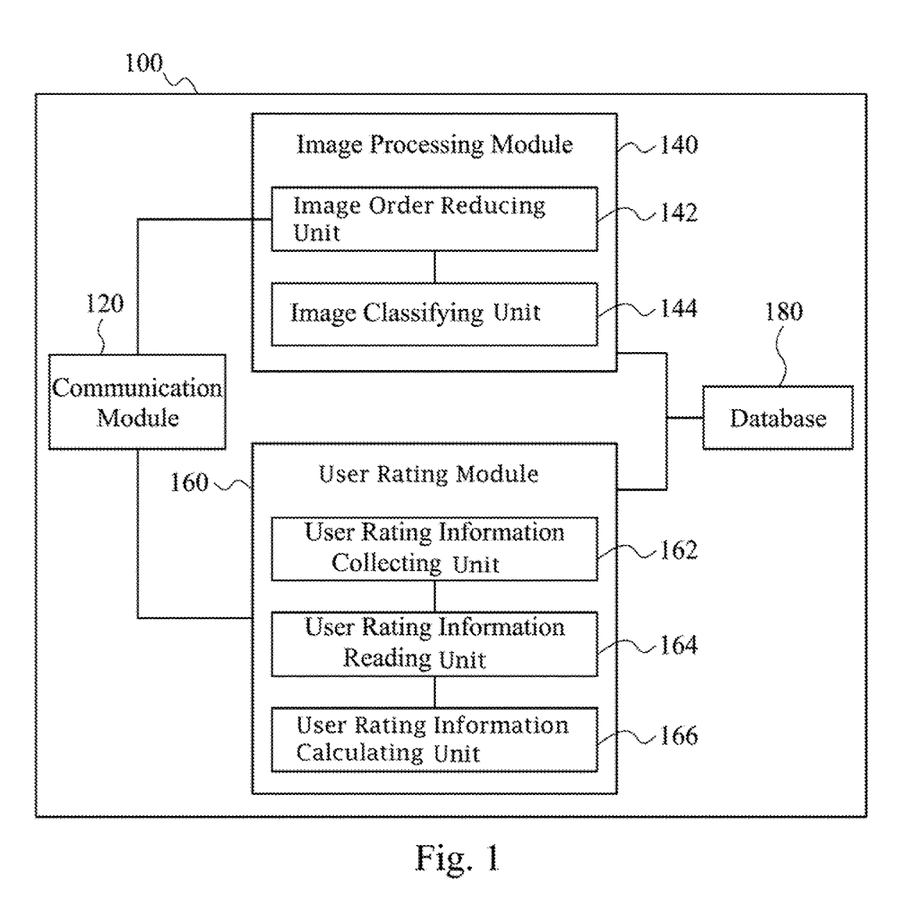
FIG. 1 is a schematic diagram illustrating a server according to some embodiments of the present disclosure.

Reference is made to FIG. 1. FIG. 1 is a schematic diagram illustrating a server 100 according to so me embodiments of the present disclosure. As shown in FIG. 1, the server 100 includes a communication module 120, an image processing module 140, a user rating module 160 and a database 180. In practice, the server 100 may be a database with functions of storing, sharing, and/or backing up pictures, a cloud server, a social network server, a file server, or other file servers having image upload functions. In some of the embodiments, the communication module 120 is configured to establish a communication connection with other servers or electronic devices to upload/download messages or data. In some of the embodiments, the communication module 120 may be a Bluetooth transmission chip, a wireless network technology (WiFi) chip, a fourth generation mobile network communication (4G) chip, a third generation mobile network communication (3G) chip, a second generation mobile network communication (2G) chip or other processing circuits with equivalent functions.

The image processing module 140 includes an image order reducing unit 142 and an image classifying unit 144. In some of the embodiments, the image processing module 140 is configured to perform an order-reducing and classifying process to the images that are uploaded to the server 100. The image processing module 140 may be a central processor unit (CPU), a graphic processing unit (GPU), a picture processing circuit, or other equivalent computing circuit. The image order reducing unit 142 and the image classifying unit 144 may be implemented by software instructions/programs executed by the image processing module 140, a firmware instruction/program, or a programmable application circuit for executing a specific function.

In some of the embodiments, the user rating module 160 may be a central processing unit (CPU) or other equivalent computing circuit. The user rating module 160 includes a user rating information collecting unit 162, a user rating information reading unit 164, and a user rating information calculating unit 166. The user rating module 160 is configured to search for user rating information, to read user rating information in the database 180, and to calculate user rating information. The user rating information collecting unit 162, the user rating information reading unit 164, and the user rating information calculating unit 166 may execute software instructions/programs executed by the user rating module 160, a firmware instruction/program, or a programmable application circuit for executing a specific function.

In some of the embodiments, the database 180 may be stored in a storage device, in which the storage device may be implemented as a read-only memory, a flash memory, a floppy disk, a hard disk, an optical disk, a flash disk, a tape, a database that can be accessed by the Internet or a storage medium having the same function that people in the art can easily think of. In some of the embodiments, the database 180 is connected to the image processing module 140 and the user rating module 160. The database 180 is configured to store the user rating information, images, order reduction images, image classification, and image information.

Figure 2:
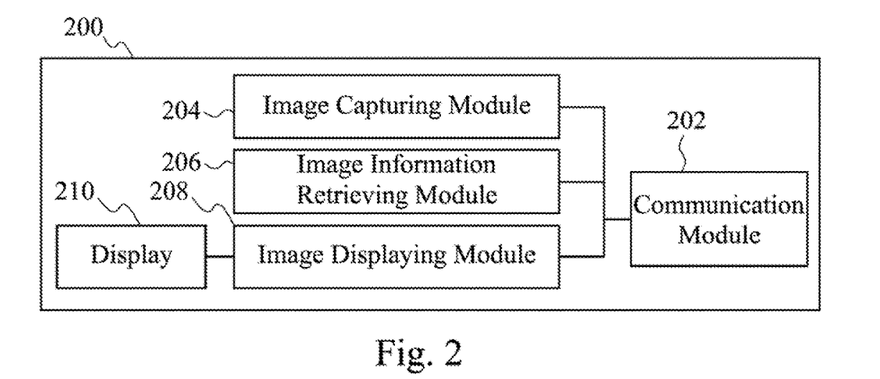
FIG. 2 is a schematic diagram illustrating an electronic device according to some embodiments of the present disclosure.

Reference is made to FIG. 2. FIG. 2 is a schematic diagram illustrating an electronic device 200 according to some embodiments of the present disclosure. The electronic device 200 includes a communication module 202, an image capturing module 204, an image information retrieving module 206, an image displaying module 208, and a display 210. In some of the embodiments, the communication module 202 is configured to establish communication connections with other servers or electronic devices to transmit messages or data. For example, the communication module 202 may be configured to upload the captured image of the electronic device, the image information, and the user information, to the server 100, or the communication module 202 may be configured to download the image, the image information, and the user rating information from the server 100. In some of the embodiments, the communication module 202 may be a Bluetooth transmission chip, a wireless network technology (WiFi) chip, a fourth generation mobile network communication (4G) chip, a third generation mobile network communication (3G) chip, a second generation mobile network communication (2G) chip or other processing circuits with equivalent functions. In practice, the electronic device 200 may be a personal digital assistant, a camera, a smart phone, a tablet computer, a notebook computer, or a personal computer.

In some of the embodiments, the image capturing module 204 may be a camera, a web camera, or other equivalent element having an image capture function. The image capturing module 204 is configured to capture images, and the electronic device 200 may upload the captured images to the server 100 through the communication module 202.

In some of the other embodiments, the electronic device 200 itself does not necessarily include the image capturing module 204, but the electronic device 200 may include an input interface (not shown), such as a memory card reader, an optical drive, or a USB connector. The electronic device 200 may read the images through the input interface and upload the read images to the server 100.

The image information retrieving module 206 is configured to read information such as the image capturing time, the image capturing location, and the exchangeable image file format (EXIF) information of the image. The image information retrieving module 206 is also configured to upload the read information to the server 100 through the communication module 202. The image displaying module 208 is configured to download the images, the user rating information, the image classification, and the image information or others through the communication module 202. The image displaying module 208 is also configured to adjust the display method and the display order of the images according to the downloaded images, the user rating information, the image classification and the image information.

The image information retrieving module 206 and the image displaying module 208 may be implemented by a central processing unit (CPU), or other processing circuits of equal quality with corresponding software or firmware.

The display 210 may be a display panel, a touch display panel, a projection unit, or other equivalent elements having equivalent functions. The images and the image information are displayed on the display 210.

Figure 3:
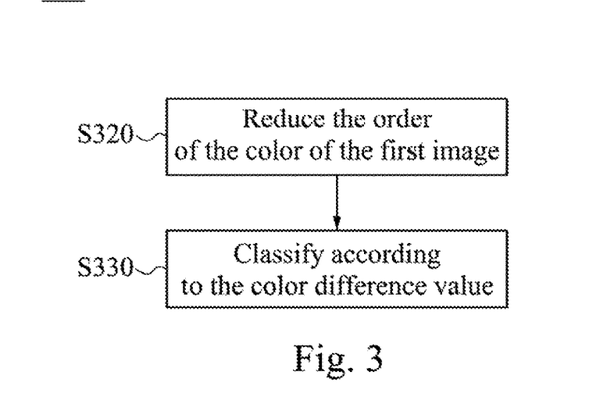
FIG. 3 is a flow chart illustrating image classifying method according to some embodiments of the present disclosure.

Reference is made to FIG. 3. FIG. 3 is a flow chart illustrating image classifying method 300 according to some embodiments of the present disclosure. As illustrated in FIG. 3, operation S320 is performed to reduce the order of the color of the first image. The reduction of the order of the color is performed by the image processing module 140 as shown in FIG. 1. For example, the reduction of the order of the color may be depth down-sampling of the composition of the primary colors of each pixel of the pictures, such as reducing the depth of the color of each pixel from 32 bits to 16 bits, from 32 bits to 8 bits, or from 16 bits to 8 bits, etc. The reduction of the order of the color may also be image compression, such as using the color of a pixel to represent the color of the neighboring pixels, or removing the non-themed color details. The reduction of the order of the color may also be the method of mosaic. The disclosure is not limited to the aforementioned methods.

The first image as a foremen honed may be obtained by capturing the first image by the image capturing module 204 in FIG. 2 and then uploading the first image to the server 100 through the communication module 202.

In some of the embodiments, the operation S320 is performed by the method of mosaic. The method of mosaic includes dividing an image into several blocks of the same size, calculating the average color value of each of the blocks by averaging a plurality of color values in each block, and using the average color value of each of the blocks as the color value within the range of each block.

Figure 4A:
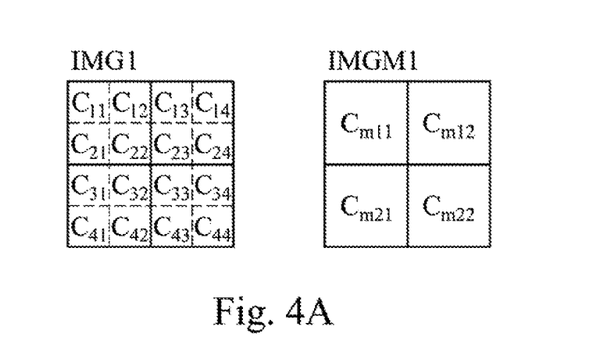
FIG. 4A is a schematic diagram illustrating an order reduction method according to some embodiments of the present disclosure.

Reference is made to FIG. 4A. FIG. 4A is a schematic diagram illustrating a first order reduction image IMGM1 produced by reducing the order of the color of the first image IMG1 according to some embodiments of the present disclosure. The first image IMG1 is the image captured by the image capturing module 204. For illustrative purpose, the first image IMG1 illustrated in the schematic diagram includes 16 pixels of the same size. In practice, the number of pixels included in the first image IMG1 is not limited to this.

As illustrated in FIG. 4A, the pixels at different positions of the first image IMG1 have color values C11 to C44 respectively. The color values may be represented as RGB color representation, HSL (hue, saturation, brightness) color representation, HSV (hue, saturation, lightness) color representation, or others. The disclosure is not limited to the color value representations described above.

When the color reduction is performed by the method of mosaic, each of the 2×2 pixels of the first image IMG1 are integrated into one block, and the average of the color values of the four pixels in the block is calculated. That is to say, of the 16 pixels of the same size, every 4 pixels will be integrated into one block, that is, a total of four blocks, and the color value of each of the blocks is the average of the color values of the four pixels included in each of the blocks.

Reference is made to FIG. 4A again. The first order reduction image IMGM1 is produced from the first image IMG1 through the aforementioned order reduction method. The first order reduction image IMGM1 includes four blocks with color values $C_{m11}$, $C_{m12}$, $C_{m21}$ and $C_{m22}$ respectively, in which the block color value $C_{m11}$ is an average value of the color values $C_{11}$, $C_{12}$, $C_{21}$, and $C_{22}$ of four pixels, the block color value $C_{m12}$ is an average value of the color values $C_{13}$, $C_{14}$, $C_{23}$, and $C_{24}$ of four pixels, and so on.

The selection of the pixels to integrate the pixels into blocks in the order reduction method of mosaic in the disclosure is not limited to the aforementioned embodiments. That is to say, the number of pixels selected for a single block is not limited to 2×2. The number of pixels may actually be selected depend on the magnitude of the order to be reduced, the performance of the processor, or the level of the details to be achieved.

Figure 4B:
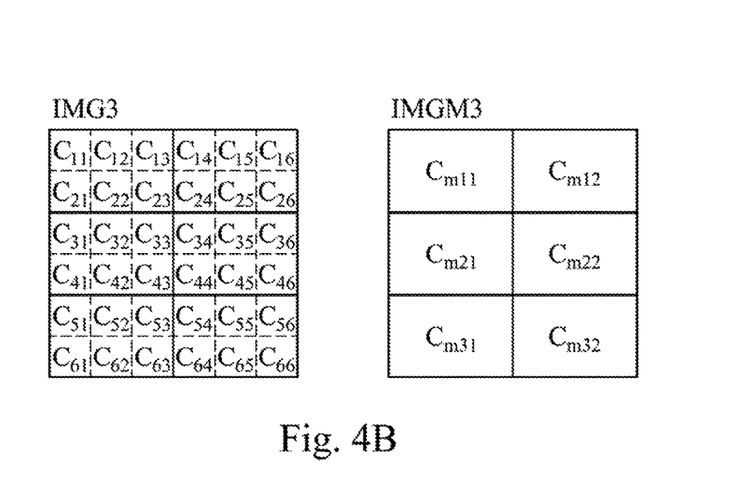
FIG. 4B is a schematic diagram illustrating the order reduction method according to some other embodiments of the present disclosure.

Reference is also made to FIG. 4B. FIG. 4B is a schematic diagram illustrating the first image IMG3 and a first order reduction image IMGM3 produced by reducing the order of the color of the first image IMG3 according to some other embodiments of the present disclosure. In some other embodiments, the first image IMG3 is the image captured by the image capturing module 204. Different from the embodiment of FIG. 4A, in some other embodiments, the first image IMG3 includes 36 pixels. The first image IMG3 includes 36 pixels, and the color values of the 36 pixels are color values $C_{11}$ to $C_{66}$, respectively. In some other embodiments, each of the 2×3 pixels of the 36 pixels of the first image IMG3 are taken as one block, and the average of the color values of the pixels in the block is calculated. That is to say, of the 36 pixels of the same size, every 6 pixels will be integrated into one block, that is, a total of six blocks, and the color value of each of the blocks is the average of the color values of the six pixels included in each of the blocks.

Reference is made to FIG. 4B again. The first order reduction image IMGM3 is produced from the first image IMG3 through the order reduction method. The color values $C_{m11}$, $C_{m12}$, $C_{m21}$, $C_{m22}$, $C_{m31}$, and $C_{m32}$ are color values of the six blocks, respectively, in which the color value $C_{m11}$ of the block is the average value of the color values $C_{11}$, $C_{12}$, $C_{13}$, $C_{21}$, $C_{22}$, and $C_{23}$ of the pixels, and the color value $C_{m12}$ of the block is the average value of the color values $C_{14}$, $C_{15}$, $C_{16}$, $C_{24}$, $C_{25}$, and $C_{26}$ of the pixels, and so on. That is to say, the number of pixels selected for a single block can also be 2×3. It is also possible to integrate M×N pixels into a single block, where M and N are positive integers of 1 or more.

For illustrative purpose, in the following embodiments, the first image IMG1 and the first order reduction image IMGM1 shown in FIG. 4A are taken as a main example but not as a limitation.

Based on operation S320, currently the first order reduction image IMGM1 may be obtained from the captured first image IMG1 through the order reduction methods. At this time, the image classifying method 300 may compare the first image IMG1 with other images already existed in the database 180 of the server 100 according to the result of the order reduction. The other images already existed in the database 180 is referred to as a second image in the subsequent embodiments. The other images already existed in the database 180 may be, for example, an image that the user has stored in the past, or an image captured and stored by another user. The first image IMG1 is classified according to the results of the comparisons.

It should be further noted that the second image already existed in the database 180 of the server 100 is also subjected to color order reduction to obtain a second order reduction image. Therefore, the database 180 stores several second images and second order reduction images in correspondence.

Figure 5:
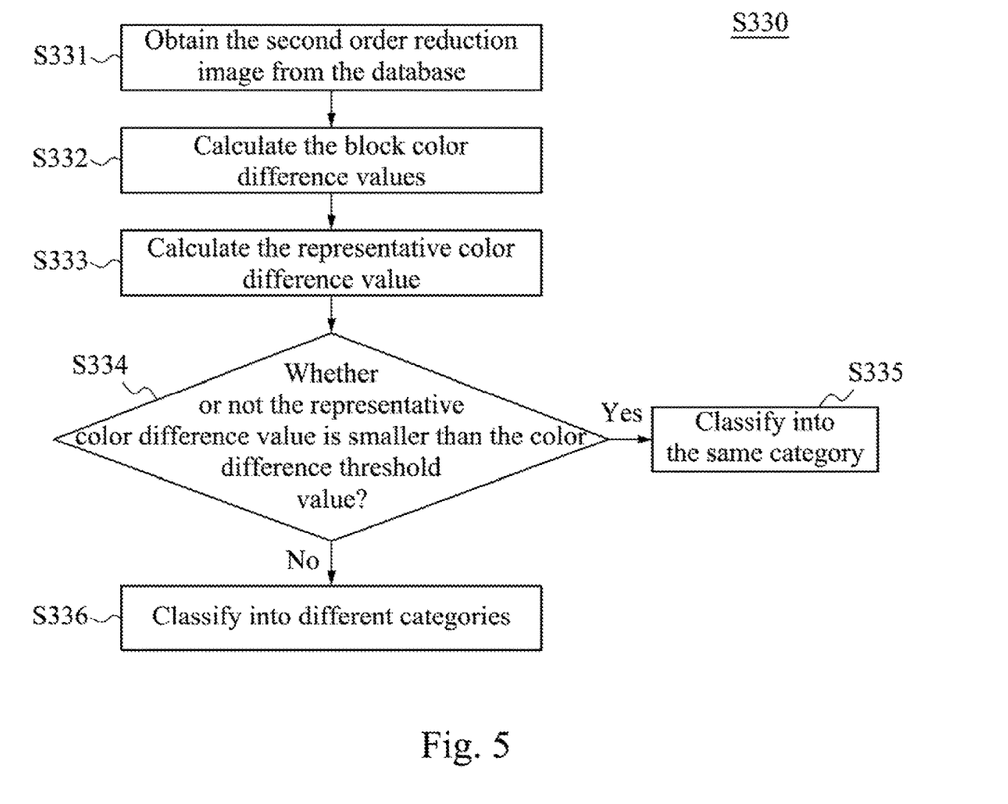
FIG. 5 is a flow chart illustrating one of the operations in FIG. 3 according to some embodiments of the present disclosure.

Reference is made to FIG. 3 again. In operation S330, the first image is classified according to the color difference value between the first order reduction image and the second order reduction image. In some of the embodiments, operation S330 is performed by the image processing module 140. Reference is made to FIG. 5. FIG. 5 is a flow chart illustrating operation S330 in FIG. 3 according to some embodiments of the present disclosure. After the first image IMG1 undergoes operation S320 of reducing the order of the color, the first order reduction image IMGM1 (as shown in FIG. 4A) is obtained.

Figure 6:
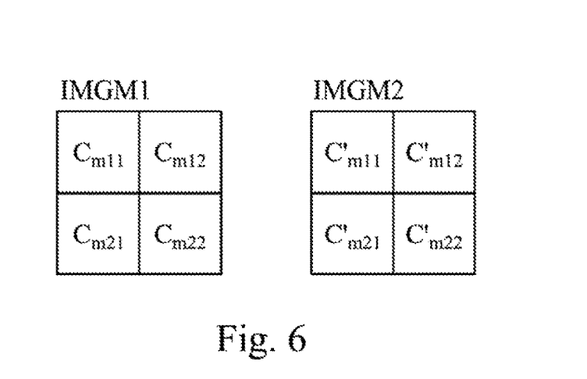
FIG. 6 is a schematic diagram illustrating a first order reduction image and a second order reduction image with several blocks respectively according to some other embodiments of the present disclosure.

Operation S331 is performed. In operation S331, the second order reduction image is obtained from the database 180. Reference is also made to FIG. 6. FIG. 6 is a schematic diagram illustrating the first order reduction image IMGM1 and the second order reduction image IMGM2 with several blocks respectively according to some other embodiments of the present disclosure. The first order reduction image IMGM1 includes four blocks corresponding to the color values $C_{m11}$, $C_{m12}$, $C_{m21}$ and $C_{m22}$, respectively. The second order reduction image IMGM2 includes four blocks corresponding to the color values $C'_{m11}$, $C'_{m12}$, $C'_{m21}$ and $C'_{m22}$, respectively.

Operation S332 is performed. In operation S332, the block color difference values are calculated. According to the differences between the respective color values $C_{m11}$, $C_{m12}$, $C_{m21}$ and $C_{m22}$ of the blocks in the first order reduction image IMGM1 and the respective color values $C'_{m11}$, $C'_{m12}$, $C'_{m21}$ and $C'_{m22}$ of the blocks in the second order reduction image IMGM2, several block color difference values are calculated.

In some of the embodiments, four block color difference values $\Delta C_{m11}$, $\Delta C_{m12}$, $\Delta C_{m21}$, and $\Delta C_{m22}$ are obtained, in which the block color difference value $\Delta C_{m22}$ is $C_{m11}-C'_{m11}$, the block color difference value $\Delta C_{m12}$ is $C_{m12}-C'_{m12}$, the block color difference value $\Delta C_{m21}$ is $C_{m21}-C'_{m21}$, and the block color difference value $\Delta C_{m22}$ is $C_{m22}-C'_{m22}$.

In some of the embodiments, the color difference values are represented in HSV color representation, and the block color difference values are calculated by taking the differences of the values of the hue, saturation and lightness of the blocks between the first order reduction image IMGM1 and the second order reduction image IMGM2 in HSV color representation, taking the absolute values of the differences, and calculating the block color difference values. For example, if the color value $C_{m11}$=(105.40, 0.30, 0.61) and the color value $C'_{m11}$=(14.60, 0.80, 1.00), the block color difference value $\Delta C_{m11}$=(105.40, 0.30, 0.61).

In some of the other embodiments, the color difference values are represented in RGB color representation, and the block color difference values are calculated by taking the differences of the values of the red, green and blue of the blocks between the first order reduction image IMGM1 and the second order reduction image IMGM2 in RGB color representation, taking the absolute values of the differences, and calculating the block color difference values. For example, if the color value $C_{m11}$=(125, 125, 125) and the color value $C'_{m11}$=(118, 118, 118), the block color difference value $\Delta C_{m11}$=(7, 7, 7).

After calculating the block color difference values, operation S333 is performed. In operation S333, the representative color difference value is calculated. In some of the embodiments, the representative color difference value of the first order reduction image IMGM1 with respect to the second order reduction image IMGM2 is calculated from the block color difference values. The representative color difference value may be calculated by using the maximum value among the block color difference values or by giving different weights to different block color difference values.

To some of the embodiments, after calculating the block color difference values between the first order reduction image IMGM1 and the second order reduction image IMGM2, four block color difference values, $\Delta C_{m11}$, $\Delta C_{m12}$, $\Delta C_{m21}$, $\Delta C_{m22}$, are obtained. The color value is represented by the RGB color representation, and the maximum value of the block color difference values is taken as the representative color difference value between the first order reduction image IMGM1 and the second order reduction image IMGM2. For example, if $\Delta C_{m11}$=(5,5,5), $\Delta C_{m12}$=(6,7,8), $\Delta C_{m21}$=(8,9,9), and $\Delta C_{m22}$=(8,9,10), the maximum value of the block color difference values is (8, 9, 10), and the representative color difference value between the first order reduction image IMGM1 and the second order reduction image IMGM2 is (8, 9, 10).

In some of the other embodiments, after calculating the block color difference values between the first order reduction image IMGM1 and the second order reduction image IMGM2, four block color difference values, $\Delta C_{m11}$, $\Delta C_{m12}$, $\Delta C_{m21}$, and $\Delta C_{m22}$, are obtained. The color value is represented by the RGB color representation, and the weights of $\Delta C_{m11}$, $\Delta C_{m12}$, $\Delta C_{m21}$, $\Delta C_{m22}$ are 0.7, 0.1, 0.1 and 0.1, respectively in calculating the representative color difference values. For example, if $\Delta C_{m11}$=(5,5,5), $\Delta C_{m12}$=(6,7,8), $\Delta C_{m21}$=(8,9,9), and $\Delta C_{m22}$=(8,9,10), the representative color difference value between the first order reduction IMGM1 and the second order reduction IMGM2 is calculated to be (5.8, 6, 6.2).

Reference is made to FIG. 5 again. After obtaining the representative color difference value between the first order reduction image IMGM1 and the second order reduction image IMGM2, operation S334 is performed. In operation S334, determining whether or not the representative color difference value is smaller than the color difference threshold. If it is determined that the representative color difference value is smaller than the color difference threshold value, operation S335 is performed to classify the first image IMG1 and the second order reduction image IMGM2 into the same category. If it is determined that the representative color difference value is not smaller than the color difference threshold value, operation S336 is performed to classify the first image IMG1 and the second order reduction image IMGM2 into different categories.

For example, the color value is represented by RGB color representation and the color difference threshold value is (10, 10, 10). If the representative color difference value is (5, 5, 5), that is, smaller than the color difference threshold value, operation S335 is performed to classify the first image IMG1 and the second order reduction image IMGM2 into the same category. If the representative color difference value is (12, 5, 12), that is, not smaller than the color difference threshold value, operation S336 is performed to classify the first image IMG1 and the second order reduction image IMGM2 into different categories.

For another example, the color value is represented by HSV color representation, and the color difference threshold value is (10, 0.1, 0.1). If the representative color difference value is (9, 0.05, 0.05), operation S335 is performed to classify the first image IMG1 and the second order reduction image IMGM2 into the same category. If the representative color difference value is (12, 0.05, 0.05), operation S336 is performed to classify the first image IMG1 and the second order reduction image IMGM2 into different categories.

In some of the embodiments of the disclosure, the first image IMG1 further includes a capturing time of the first image IMG1 or a capturing location of the first image IMG1. The image classification is performed according to the color differences and capturing time or capturing location, in which the capturing time of the captured image or the capturing location of the image is performed by the image information retrieving module 206 as shown in FIG. 2.

For example, in some of the embodiments, if the representative color difference value between the first image and the second image is smaller than the color difference threshold value and the capturing time of the first image and the second image are both between 9:00 am to 10:00 am in the Taiwan time zone, the first image and the second image are classified into the same category. If the representative color difference value between the first image and the second image is smaller than the color difference threshold value but the capturing time of the first image is between 9:00 am to 10:00 am in the Taiwan time zone and the capturing time of the second image is between 9:00 pm to 10:00 pm in the Taiwan time zone, the first image IMG1 and the second image are classified into different categories.

For another example, in some of the embodiments, if the representative color difference value between the first image and the second image is smaller than the color difference threshold value and the capturing location of the first image IMG1 and the second image are both within Taipei City of Taiwan, the first image IMG1 and the second image are classified into the same category. If the representative color difference value between the first image and the second image is smaller than the color difference threshold value but the capturing location of the first image is within Taipei City of Taiwan and the capturing location of the second image is within Pingtung City of Taiwan, the first image and the second image are classified into different categories.

Figure 7:
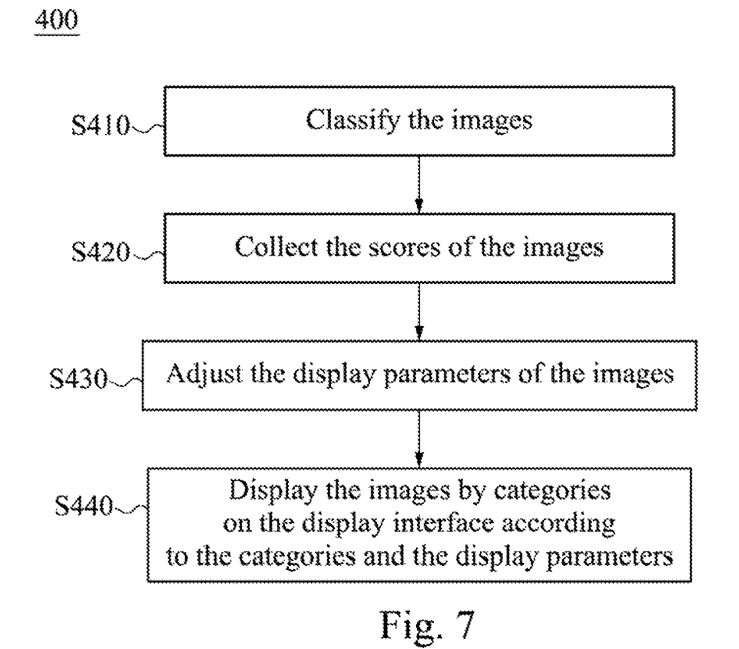
FIG. 7 is a flow chart illustrating image displaying method according to some embodiments of the present disclosure.

Reference is made to FIG. 7. FIG. 7 is a flow chart illustrating image displaying method 400 to control such as the display 210 of the electronic device 200 in FIG. 2 according to some embodiments of the present disclosure. Operation S410 is performed to classify the images. The image classification method may be performed according to the image capturing time, performed according to the image capturing location, and/or performed according to the color difference value between the images.

In some of the other embodiments of the present disclosure, the first image IMG1 further includes exchangeable image file format information. The exchangeable image file format information includes image information such as image orientation, image resolution, image size, capturing time, capturing location, and image capturing mode, etc. The image classification may be according to color difference values and exchangeable image file format information. The retrieving of the exchangeable image file format information of the captured image is performed by the image information retrieving module 206 in FIG. 2.

For example, in some of the embodiments, if the representative color difference value between the first image and the second image is smaller than the color difference threshold value and the image resolution of the first image and the second image are both 1000 dpi, the first image and the second image are classified into the same category. If the representative color difference value between the first image and the second image is smaller than the color difference threshold value but the image resolution of the first image IMG1 is 1000 dpi and the image resolution of the second image is 72 dpi, the first image IMG1 and the second image are classified into different categories.

Figure 8:
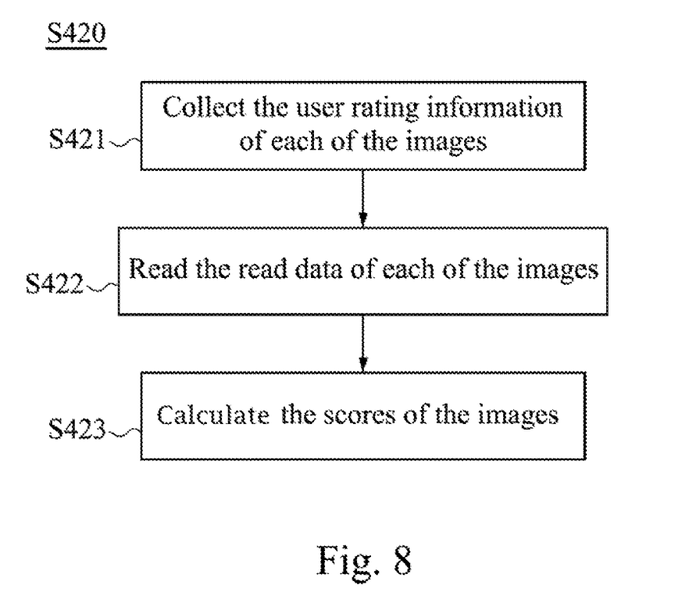
FIG. 8 is a flow chart illustrating-one of the operations in FIG. 7 according to some embodiments of the present disclosure.

Reference is made to FIG. 7. After classifying the images, operation S420 is performed to collect the scores of the images. Reference is made to FIG. 8. FIG. 8 is a flow chart illustrating operation S420 in FIG. 7 according to some embodiments of the present disclosure. Operation S421 is performed to collect user rating information of each of the images. The user rating information includes positive factors and negative factors. Positive factors are factors that are favorable for the rating of the images and give the images better scores when calculating scores of the images, while the negative factors are factors that are unfavorable for the rating of the images and give poor scores when calculating scores of the images. The positive factors and negative factors are further divided into dominant factors and recessive factors. Dominant factors are factors that directly represent like/dislike the images. Recessive factors are factors that do not directly represent like/dislike the images but are factors that imply like/dislike the images.

The dominant factors of the positive factors include the number of positive ratings and/or the number of collections. The recessive factors of the positive factors include the number of friends of the image photographers, the number of views, and/or the number of detailed information click through. The dominant factors of the negative factors include the number of negative ratings. The recessive factors of the negative factors include the number of the image photographers that has been reported by users in the past six months and/or the length of time the images having no positive ratings, and the like.

Reference is made to FIG. 8. After collecting the user rating information for each of the images, operation S422 is performed to read the read data of each of the images from the database 180 in FIG. 2. The read data includes the user rating information and/or the scores of the images stored in the database 180 related to the images, and the like.

Reference is made to FIG. 8 again, after collecting the user rating information of the images and reading the related read data of the images, operation S423 is performed to calculate the scores of the images.

In some of the embodiments, in operation S423, the read data and the user rating information are combined to calculate the scores of each of the images. In some of the embodiments, the scores of each of the images are calculated by picking several factors from the user rating information.

For example, when calculating scores of the images, the number of positive ratings, the number of collections, the number of views, and the number of detailed information click through of the positive factors of the user rating information are counted in, and the number of negative ratings, as well as the length of time the images having no positive ratings of the negative factors of the user rating information are also counted in.

An example of the rating method for each of the user rating information is shown in Table 1:

TABLE 1

| | Factors | | | | | |
|---|---|---|---|---|---|---|
| | Positive factors | | | | Negative factors | |
| | Number of positive ratings | Number of collections | Number of views | Number of detailed information click through | Number of negative ratings | The length of time having no positive ratings |
| Rating method | +1/per number of positive ratings | +0.5/per number of collections | +0.1/per number of views | +0.1/per number of detailed information click through | −1/per number of negative ratings | −0.2/per day having no positive ratings |

As shown in Table 1, in the calculation of the scores of the images, +1 points for each positive rating, +0.5 points per collection, +0.1 points per view, +0.1 points per detailed information click through, −1 points per negative rating, and −0.2 points per day having no positive ratings. For example, if an image has 60 positive ratings 40 collections, 100 views, 30 detailed information click through, 3 negative ratings, and 10 days having no positive ratings, the score of the image is 88 points.

In some of the embodiments, operation S423 further includes adjusting the calculated score according to the categories in the read data and the scores in the read data. For example, gives bonus points to the categories that are more popular among the classifications, or gives different weights respectively to the scores in the read data and the scores calculated according to the user rating information. The more popular categories may be categories with higher number of views, or categories of the pictures that belong to the season.

Reference is made to FIG. 7 again. After calculating the scores of each of the images, operation S430 is performed to adjust the display parameters of the images according to the scores of each of the images.

Adjusting the display parameters of each of the images includes adjusting the display order of each of the images in one of the categories to which the images belong or adjusting the display size of the images. For example, the images with the higher scores are arranged in front of the display order and the images with the lower scores are arranged rearward in the display order, or images with the higher scores are have larger display sizes, and images with the lower scores have smaller display sizes.

Reference is made to FIG. 7 again. After adjusting the display parameters of the images, operation S440 is performed to display the images by categories on the display interface according to the categories and the display parameters.

For example, in some of the embodiments, there are A, B, C, D and E five images, which are divided into three categories. The first category has A, the second category has B and C, and the third category has D and E. If A, B, C, D, and E have scores of 150, 70, 350, 900, and −20, respectively, the display parameters of A, B, C, D, and E are 1-1, 2-2, 2-1, 3-1, and 3-2, respectively, in which the preceding numbers indicate the order of the categories, and the following numbers indicate the order that the categories are displayed. The smaller the number of the display parameters is, the higher the priority of the display order will be.

Based on the aforementioned embodiments, the present disclosure provides an image classifying method and an image displaying method. The image classifying method is an image classifying method using color differences between images. Since images of similar themes have less color differences than images of non-similar themes, such image classifying method may classify images according to their respective themes, and the users are also more convenient when browsing the images. For example, images may be classified as morning, sunset, maple leaf and other themes, and the users do not need to classify the images manually. At the same time, reducing the order of the color of the images may reduce the computational complexity. Furthermore, the image displaying method is performed based on the categories and the scores, which allows the users to browse the image with a higher score earlier and improves the convenience of the users when viewing the images.

In this document, the term "coupled" may also be termed as "electrically coupled", and the term "connected" may be termed as "electrically connected", "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one unit from another. For example, a first unit could be termed a second element, and, similarly, a second unit could be termed a first element, without departing from the scope of the embodiments. As used herein, the term "and/or" includes any and all combinations of one or more of the associated listed items.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An image displaying method, suitable for a database which comprises a plurality of images, wherein the image displaying method comprises:
    classifying the images into a plurality of categories according to a plurality of color difference value between the images;
    collecting a plurality of scores of the images;
    adjusting at least one display parameter of the images according to one of the plurality of scores of each of the images; and
    displaying the images by the categories on a display interface according to the categories and the at least one display parameter.

2. The image displaying method of claim 1, wherein adjusting the at least one display parameter comprises adjusting a display order of each of the images in the categories that the images belong to or adjusting a display size of the images.

3. The image displaying method of claim 1, wherein collecting the scores comprises:
    collecting user rating information of each of the images;
    reading read data of each of the images from the database; and
    combining the read data and the user rating information and calculating the score of one of the images.

4. The image displaying method of claim 3, wherein the user rating information comprises a positive factor and a negative factor, wherein the score of the one of the images is positively correlated to the positive factor which corresponds to the one of the images, and the score of the one of the images is negatively correlated to the negative factor which corresponds to the one of the images.

* * * * *